Figure 5:
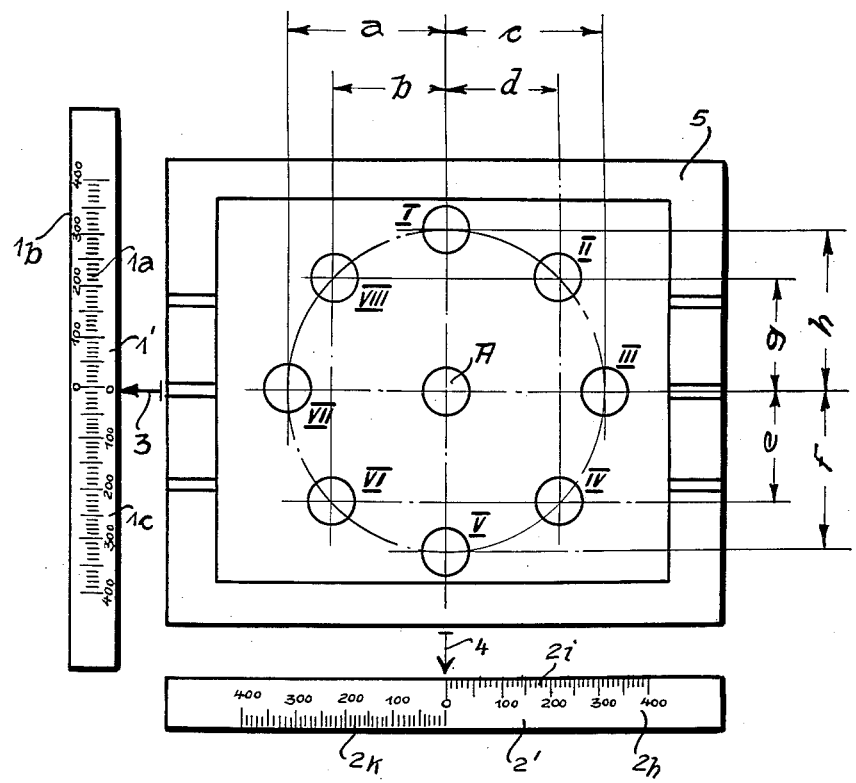

Dec. 13, 1960     G. R. WOLFLE     2,963,791
MEASURING ATTACHMENTS FOR THE TABLES OF
PRECISION DRILLING MACHINES
Filed May 28, 1956     7 Sheets-Sheet 1
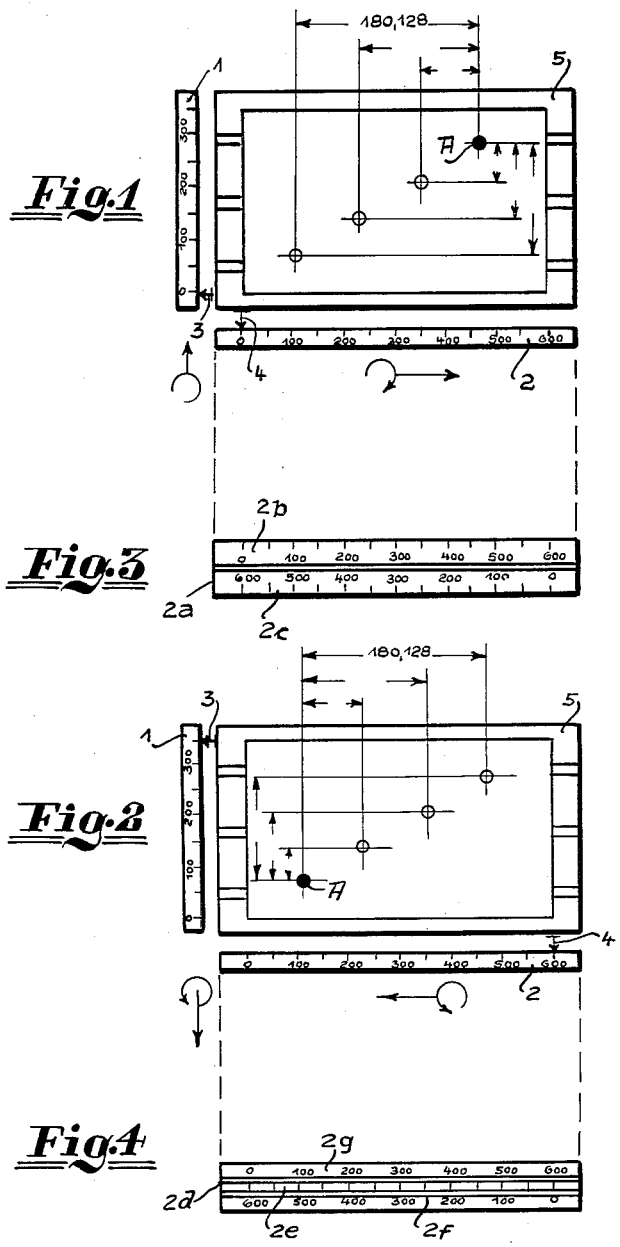

United States Patent Office 2,963,791
Patented Dec. 13, 1960

2,963,791

MEASURING ATTACHMENTS FOR THE TABLES OF PRECISION DRILLING MACHINES

Georg R. Wolfie, Offenbach (Main), Germany, assignor to M.S.O. Maschinen- und Schleifmittelwerke Aktiengesellschaft, Offenbach (Main), Germany, a German company Filed May 28, 1956, Ser. No. 587,857

Claims priority, application Germany May 28, 1955

1 Claim. (Cl. 33—125)

This invention relates to measuring apparatus.

Work tables of machine tools such as, for example, the coordinate tables of drilling machines, are generally provided with measuring attachments which enable the tables to be adjusted from a basic position by amounts which can be read off on the associated measuring attachment. These measuring attachments generally consist of metal or glass rules or straightedges which are fixedly arranged on the machine frame, and with which an adjustable pointer is associated at the table in question. The straightedges are provided with only one graduation.

However, this construction of measuring attachments has the disadvantage that in many cases, when adjusting the coordinate measurements, it is necessary to convert the measurements entered on the associated drawing such as, for example, for the spacing of holes which are to be formed. It is to be noted that, for example, when drilling holes whose spacing from one another must be observed with small tolerances, all measurements have to be adjusted from an initial hole, in order to prevent unavoidable adjusting errors from becoming accumulative. However, it is often not possible to clamp a workpiece on a table such that the measurements proceeding from the reference point extend in the direction of the graduation. Thus, for example, with a workpiece consisting of a plate, in which four holes arranged in the same manner are to be drilled, it may be necessary to clamp the plate in one case in the manner shown in Figure 1 and in another case in the manner shown in Figure 2, so that the reference hole A is situated either in the right-hand rear corner or in the left-hand front corner. If the work table only has associated therewith in known manner the straightedges or scales edges 1, 2 with a graduation starting from the left-hand end, with which co-operate the pointers 3 and 4 adjustably secured on the tables, then if the clamping is effected according to Figure 1, the amounts of the table adjustment according to the measurement starting from the reference hole or bore A can only be directly adjusted according to the graduations of the scale edges if the two pointers 3 and 4 are adjusted to zero when the axis of the reference bore is in coincidence with the axis of the tool. (The arrows drawn in the figure indicate the direction of adjustment or the direction of rotation of the setting wheels.) On the other hand, if the workpiece must be clamped in the position according to Figure 2, it is true that the pointers can be adjusted to the end of the graduations when the axis of the tool is in coincidence with the reference bore, but the worker can, for example, still not set the recorded dimension of 180, 128 by simply reading off the dimensions on the scale 2, but he must derive this dimension from the final number of the scale, and then adjust the pointer 4 to

600—180, 128=419, 872

In this case, the decimal points on the scale must be read off in the reverse direction. This conversion of the co-ordinate dimensions, the reverse reading of the decimal points and the fact that the directions of rotation of the setting elements are changed in certain circumstances, lead however to incorrect settings and thus loss of the workpiece.

These defects are eliminated according to the invention, by the fact that with a measuring attachment for the coordinate table of precision drilling machines, consisting of measuring scales associated with the tables and pointers co-operating with the said scales, the scales are provided with two opposite sets of graduations. Owing to this novel construction, the dimensions to be set can be adjusted directly according to one or other of the scales, independently of the position of the reference point. In one expedient form, these graduations of the the different scales and reading-off scales which are associated with one another are preferably of the same color, while the oppositely directed graduations are of a different color and suitably illuminated, and also means can be provided in order that the measurement scales not in use at any time can be concealed from view of the worker in order to prevent any setting being carried out in accordance with these graduations.

The invention is more fully explained by reference to constructional examples which are illustrated in the drawing with which additional features will become apparent.

Figure 6:
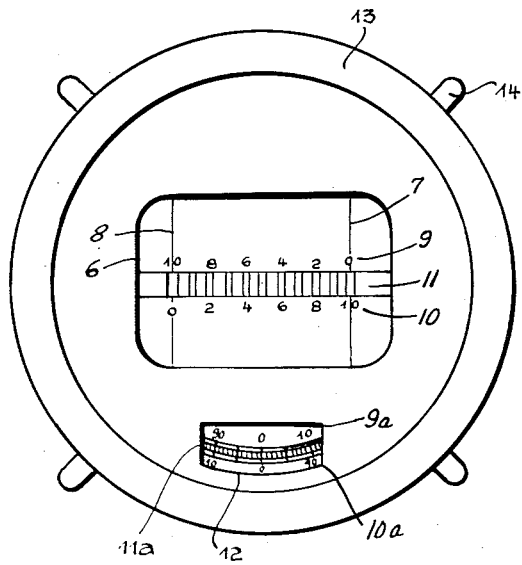
Figure 7:
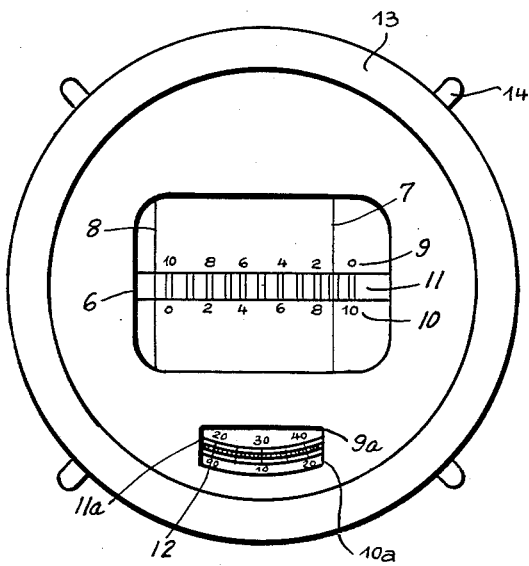
Figure 8:
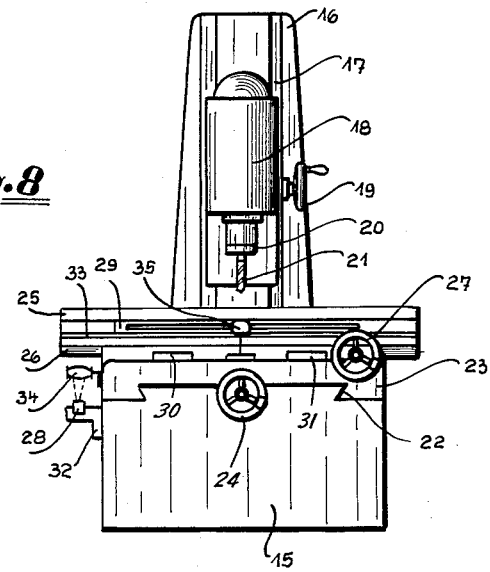
Figure 9:
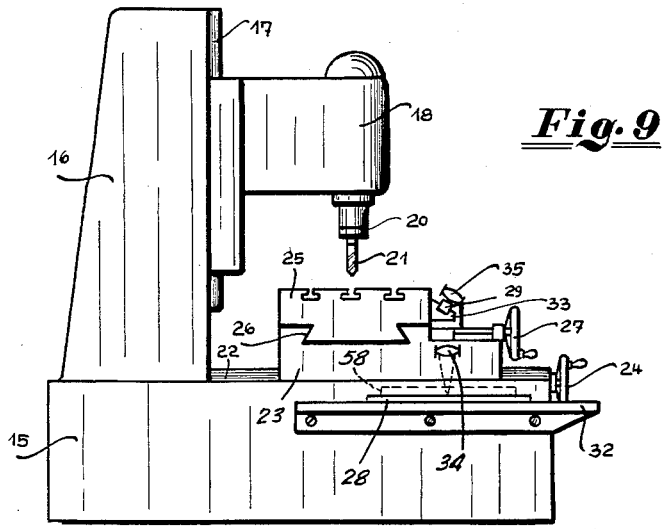
Figure 10:
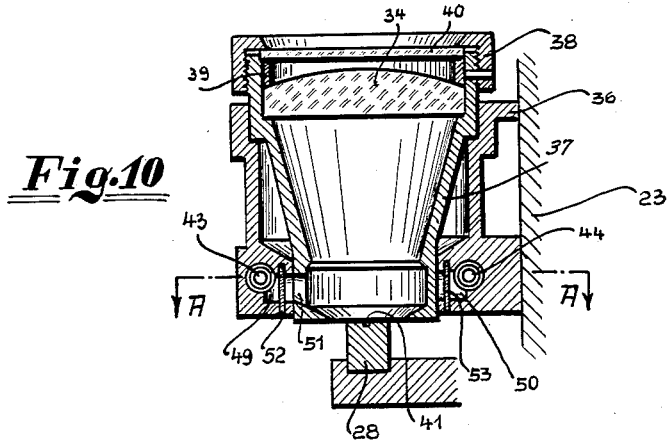
Figure 11:
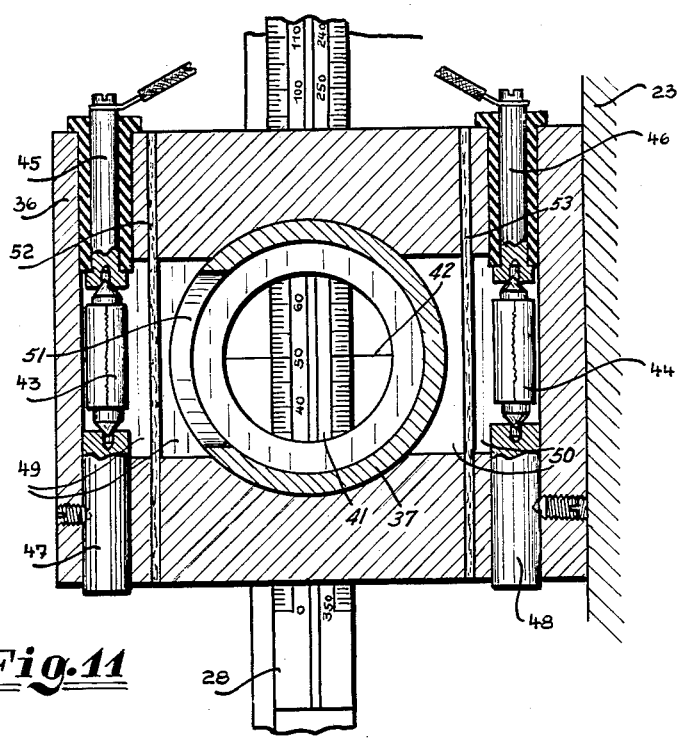
Figure 12:
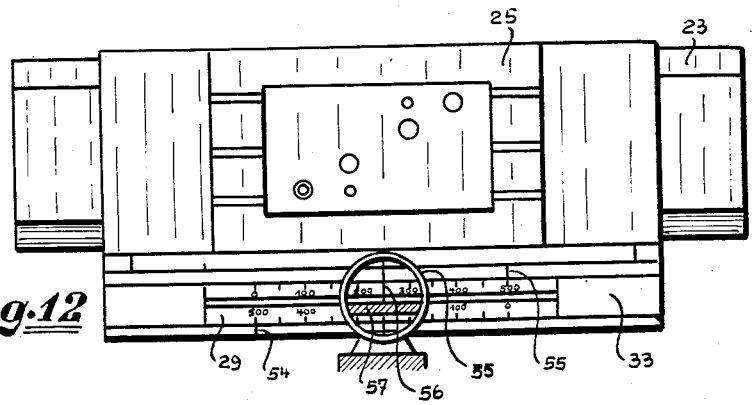
Figure 13:
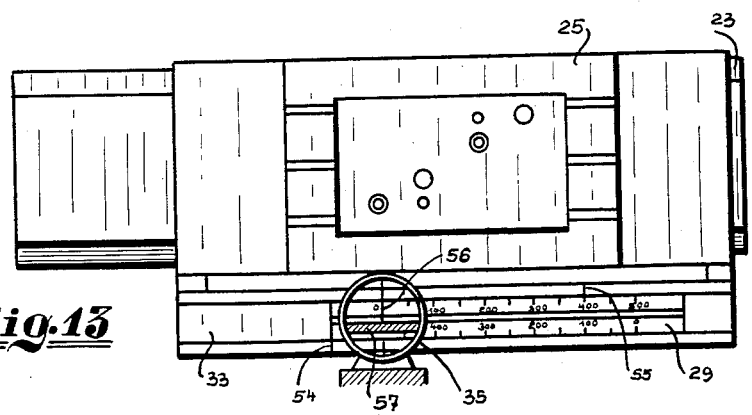
Figure 14:
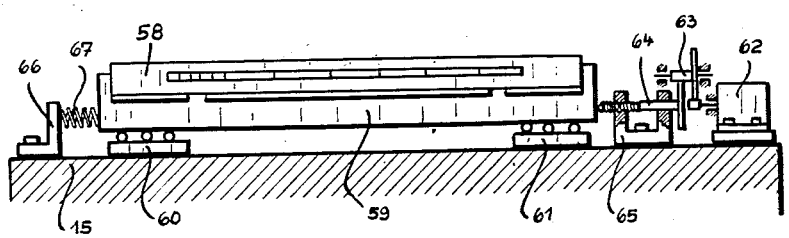
Figure 15:
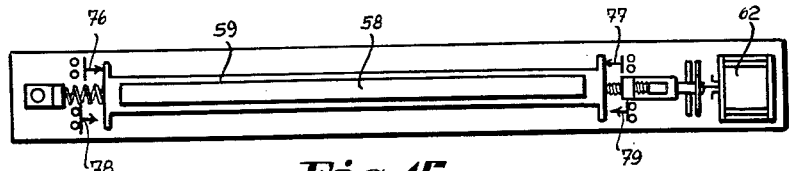
Figure 16:
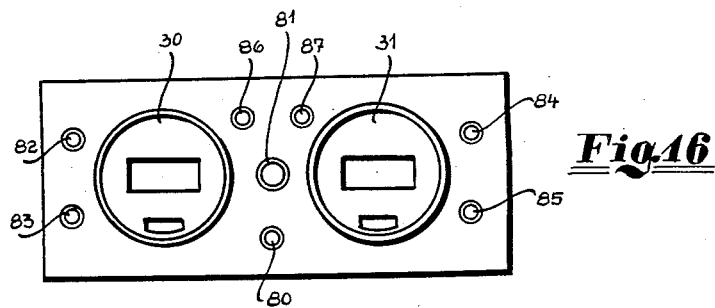
Figure 17:
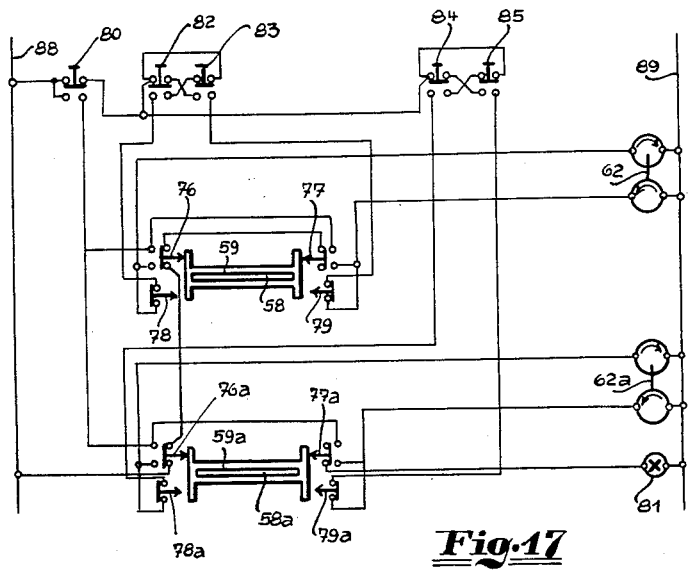

In the drawings:

Figures 1 and 2 show a coordinate table with the two measuring scales of known construction, Figures 3 and 4 show two scales which, for example, replace the measurement scales 2 according to Figures 1 and 2, Figure 5 shows another constructional form of the scales, Figures 6 and 7 show an optical reading device in two positions, Figures 8 and 9 are respectively a front elevation and side elevation of a precision drilling machine provided with the new attachment, Figure 10 shows the eyepiece lens construction in cross-section, Figure 11 is a section on the line A—A of Figure 10, Figures 12 and 13 are views, on enlarged scale, showing a plan view of the work table with one of the scales in two positions, Figure 14 shows the arrangement of a precision measuring attachment for the precision measurement of the setting movements of the cross slide, Figure 15 shows the assembly of the two measuring attachments with an electrical control arrangement in a switch panel, Figure 16 is a front view of the indexing and steering plate, and Figure 17 shows the associated circuit diagram.

Referring to the constructional form according to Figure 3, the scale 2 provided with the simple graduation system according to Figure 1 is replaced by a scale 2a with two oppositely directed sets of graduations 2b, 2c. Consequently, any dimension which is to be set can be adjusted directly both from the left-hand end point and from the right-hand end point. A similar scale also takes the place of the scale 1 which is shown in Figure 2.

In the modification according to Figure 4, the scale 2d is only provided with one graduated scale 2e, but this scale has two sets of numbers or indicia 2f, 2g running in opposite directions.

The scales can also be constructed as circular or tape-like scales with circular or linear graduations. The subdivision of these scales depends upon the degree of accuracy which is actually required. Each scale can also be provided with two sets of numbers corresponding, for example, to centimeters and inches.

The coordinate table according to Figure 5, with the two adjustable pointers 3 and 4, carries the workpiece plate in which are to be drilled eight holes I–VIII disposed in a circle; these holes are measured on the working drawing from the center of the circle A, so that the following coordinate dimensions are provided for the separate holes:

| Hole | $x$-direction | $y$-direction |
|---|---|---|
| I | 0 | $h$ |
| II | $d$ | $g$ |
| III | $c$ | 0 |
| IV | $d$ | $e$ |
| V | 0 | $f$ |
| VI | $b$ | $e$ |
| VII | $a$ | 0 |
| VIII | $b$ | $g$ |

Therefore $$a=-c;\ b=-d$$
$$g=-e;\ lr=-f$$

Two scales 1' and 2' are associated with the table. The scale 2' for adjusting the dimensions in the $x$-direction has graduations 2h extending on both sides from a zero point, one of the arms having a set of graduations 2i at the top and the other arm a set of graduations 2k at the bottom.

The scale for the $y$-direction has a continuous graduation 1a and a scale 1b extending from the center towards the right, as well as a scale 1c starting from the same zero point, the scale 1b being above the graduations and the scale 1c below the said graduations.

With this design of the measurement graduations, it is possible for all coordinate readings to be effected with two zero positions, the position of the holes in relation to the reference point not being important.

For reading off extremely fine graduations with high accuracy, the new graduations can also be equipped with optical means. The graduation is either read off directly by means of a microscope or is projected with enlargement on to a ground glass screen. Generally speaking, the precision graduations are made with intervals of 1 mm. For reading off fractions of a millimetre, a cross scale is introduced into the path of rays of the optical system, the said scale subdividing the distance of, for example, 1 millimetre into 10 parts, so that values of $\frac{1}{10}$ of a millimetre can be read off accurately in the microscope or on the ground glass screen. Moreover, the subdivision of the spacing of two division lines between the measuring attachment which is projected in enlarged form on the ground glass screen can also be engraved on the latter.

With the constructional form according to Figure 6, the ground glass 6 is provided with two subdivision scales 9 and 10 which are numbered in opposite directions and which can also be offset (as shown in Fig. 5) relatively to one another in the longitudinal direction. Two adjacently disposed division lines of the precision scale are projected on to the ground glass 6 with a magnification of about 50 times, so that the spacing thereof on the ground glass screen is, for example, 50 mm. According to the example, this distance is subdivided into 10 sections, the divisions being in the form of double lines, between which the precision scale graduations which are recorded can be adjusted with high accuracy on to the middle of the zones limited by the double lines. With this arrangement, it is therefore possible for table displacements of $\frac{1}{10}$ of a millimetre to be accurately effected and read off.

If even smaller fractions of a millimetre are to be read off, the distance between the two projected precision scale divisions 7 and 8 is subdivided into a larger number of parts, or the ground glass 6 and the cross scale interposed into the path of rays is displaced in the direction of its graduations by an amount according to an additional graduation 12, for example by means of a micrometer screw. Even this graduation 12 is provided with two opposite graduations 10a, 11a.

With the constructional form according to Figures 6 and 7, the ground glass 6 is displaceable in the direction of the division by rotating the ring 13 provided with knobs 14. The value of the actual path of displacement is in this case indicated on the small scale 12 in $\frac{1}{1000}$ of a millimetre. With both scales, the 10 divisions of the subdivisions 11 and 11a are disposed between the two opposite series of numbers or indicia 9 and 10 or 9a and 10a.

With the measuring attachments provided according to the invention with double divisions, the danger exists of the scales being confused when setting the work table. In addition, with work tables which are equipped for each setting movement with two measuring attachments, for example a coarse and a precision measuring attachment, the divisions of which are read off separately, a guarantee must be provided so that always those graduations of the measuring attachments which run in the same direction are read off. The means provided for this purpose are hereinafter explained by reference to one specific constructional form.

With the precision drilling machine according to Figures 8 and 9, the stand 16 is fixed to the machine bed 15. The drill head 18 is guided for adjustment in the vertical guideway 17 of the stand 16. By means of the handwheel 19, the drill head can be moved manually in its guideway; an automatic feed of the drill head is also provided. The motor-driven drill spindle 20 is rotatably mounted in the drill head 18 and it carries the drilling tool 21.

The cross slide 23 of the co-ordinate table slides on the machine bed 15, in the guideway 22 of the latter; its adjustment is effected by means of the handwheel 24. The clamping or coordinate table 25 is displaceable manually in the guideway 26 of the cross slide by means of the handwheel 27. Means may also be provided for automatic displacement of the cross slide and of the work table.

A workpiece clamped on the work table 25 can therefore be moved in the directions of two coordinates which are disposed perpendicularly to one another.

The measuring attachment which corresponds to the invention and which permits the adjustment to scale of the coordinate measurement, consists of the two coarse scales 28 and 29 and two precision scales with optical reading means arranged inside the coordinate table. The precision scale graduations are projected on to the ground glass screens of the two reading devices 30 and 31.

The coarse scales 28 and 29 which are longitudinally displaceable on the supports 32 and 33 are provided with the double graduations described according to Figure 3, whereas the precision scales in the example are only provided with an unnumbered graduation. The opposite double graduations for the precision scales according to the invention are recorded on the ground glass screen 6 of the reading devices 30 and 31 according to Figures 5 and 6.

The eyepiece lenses 34 and 35 fixed to the cross slide serve for conveniently reading off the the coarse measurements.

The lens 34 (Figure 10) is fixed by means of a nut 38 and an intermediate ring 39 in a housing 36 (Figures 10 and 11) secured to the cross slide 23 (Figures 8 and 9) in a rotatably mounted lens mount 37. The glass sheet 40 serves as a means for protecting the lens 34 against being scratched.

According to the invention, for concealing the numbers or indicia on the part of the coarse scale which is not in use when the work table is being adjusted, a masking strip or diaphragm 41 is secured to the bottom end of the lens mount 37 eccentrically of the axis of the latter. A steel wire 42 (Figure 11) also fixed to the lens mount is stretched at right angles to the diaphragm 41. It serves as a setting mark for the adjustment of the dimension according to the scale divisions. By rotating the lens and the lens mount through 180° in each case, either one or the other of the figure plates of the double scale graduation is covered, owing to the eccentric position of the diaphragm 41.

The housing 36 is provided at each side of the lens mount 37 with a light slot 49 or 50, in which are disposed low-voltage lamps 43 and 44. The lamps 43 and 44 are held between contacts 45, 46, 47, 48. In the region of the housing slots 49 and 50, the lens mount 37 has a slot 51, which can at will be brought into coincidence with one of the slots 49, 50. Differently colored light filters 52, 53 are positioned in front of the incandescent lamps 43, 44 in the slots 49, 50, so that the scale can, for example, be illuminated with red or green light, depending upon the position of the lens mount 37 or the slot 51.

Figure 12 shows diagrammatically the scale support 33' fixed to the work table 25 of the machine, the said support having a coarse scale 29 and the eyepiece lens 35. The scale carrier or support is provided with two indexes 54 and 55, which coincide with the end graduations of the scale when the work table or the middle of its maximum path of adjustment and the coarse scale are situated in the middle position, that is to say, the middle of the clamping surface of the work table coincides with the middle of the coarse scale graduation.

Figure 13 shows the scale position according to the zero setting of the coarse scale 29.

For the purpose of setting the scale 29 at zero (zero setting) the said scale has been displaced towards the right by a distance of 100 mm. on its support (upper graduation). The maximum path of adjustment of the work table is for example 500 mm., corresponding to the length of the scale graduation. The part of the adjustment path which is still available is shown as being 400 mm. by the line on the upper graduation of the scale 29. The figures of the lower graduation are concealed by the diaphragm 57 in the reading zone of the eyepiece lens 35.

Figure 14 shows diagrammatically the arrangement of the precision measuring attachment in the form of a precision scale for the precision measurement of the setting movement of the cross slide 23 (Figures 8 and 9).

The precision scale 58 is fixed on the scale carrier 59. The scale carrier can be displaced in the direction of its longitudinal axis relatively to the machine bed 15 on the roller guide track 60 and 61. After press buttons on the switchboard have been actuated, the motor 62 rotates a micrometer adjusting spindle 64 in the required direction by way of a reduction gear 63. The threaded spindle 64 is guided in a nut 65 fixed on the machine bed 15. The scale carrier 59, by means of the compression spring 67 supported on an abutment 66 which is also fixed to the machine bed 15, is resiliently urged against the spindle projection of the micrometer spindle 64. According to the direction of rotation of the motor, the scale carrier 59 and thus the precision scale 58 can be moved against or in the direction of the spring force of the spring 67. In the example, the precision scale is only provided with an unnumbered fine graduation with a spacing between the divisions of 1 mm.

The precision scale for the precision measurement of the setting movement of the work table 25 (Figures 8 and 9) is moved with the work table and is carried out in a manner analogous to that shown in Figure 13.

Since the movements of the precision scales in two directions are separate, they must be brought to the middle position before starting the settings or adjustments of the coordinate table.

The two precision scales provided in the example are set at the middle position automatically after actuating a press button on the switchboard of the machine.

For automatically adjusting the precision scales, two switches 76, 77, and 78, 79, respectively, are arranged facing each of the two ends of each precision scale carrier 59 (Figure 15). The switches 76 and 77 are fitted with impulse contacts, which effect a reversal movement when the switch pin is moved in the direction of the switch and after a small travel of the pin. In the middle position of the precision scale 58 or its support 59, as shown in Figure 17, those switch contacts of the switches 76 and 77 facing it are closed. If the scale is only moved a small distance from its middle position, the switch 76 or the switch 77 is changed over; the formerly closed switch contacts are opened and the two opposed contacts are closed.

Switches 78 and 79 are provided in order to limit the stroke of the precision scale displacement.

The adjusting motors 62 and 62a for the precision scales 58 and 58a are designed as double motors with separate windings for each direction of rotation. Motor 62a adjusts the precision scale 58a.

It will be seen from the diagram (Figure 17), that after the press button 80 has been actuated, both motors 62 and 62a are switched on, if both precision scales 58 and 58a are disposed outside the middle position, but on the other hand only one motor is switched on when only one precision scale has left the middle position. Consequently, the motor is always switched on to run in the direction which is necessary for returning the scale 58 or 58a to its middle position.

The press buttons 82 and 83, or 84 and 85, serve for the zero setting of the precision scales. Element 81 is a control lamp and the control leads are indicated by the references 88 and 89.

The press buttons 86 and 87 (Figure 16) are provided for switching on the coarse scale illuminating means 43 and 44 (Figure 11).

The measurement or setting of a coordinate value, for example, of the dimensions 180, 128 (Figure 2), is carried out in the manner hereinafter described after the initial reference bore has been made, this being effected by means of the measuring attachment of the coordinate table of the machine and a sighting microscope in the required and exact position, for example, in relation to certain edges of the workpiece.

(1) By actuating a press button, the precision scales with limited displacement in the adjustment directions of the coordinate table are brought by a motor drive into the middle position. The middle position is reached when a signal lamp arranged at the switchboard of the machine is illuminated.

(2) Rotating the eyepiece lens in such manner that the diaphragm 57 (Figures 12 and 13) covers the dial plate of that lower graduation of the coarse scale which is not required for setting purposes. By rotating the eyepiece lens, the scale is illuminated with light of a predetermined colour, for example red.

(3) Displacing the coarse scale 29 on its support (Figures 8 and 9 and Figures 12 and 13) in the longitudinal direction until the zero mark of the selected graduation of the scale 29 provided with two opposite graduations coincides with the index 56 of the eyepiece lens 35.

After the zero adjustment has been made, the coarse scale is connected fast to the table. (Figure 13 shows the lens 35 with the diaphragm 57 and the coarse scale 29 after the adjustments according to 2 and 3.

(4) The small lower scale 12 of the reading device (Figure 6) is also set to zero by rotating the ring 13 (scale 9a, red).

(5) The precision scale of the work table 25 (Figures 8 and 9) is displaced by a motor relatively to the work table in the direction of its longitudinal axis by actuating a press button, the displacement being to such an extent that, for example, the two projected precision scale lines are disposed exactly in the middle of the two zero index gaps. Figure 6 shows the "zero setting" of the reading device.

After this preparatory setting (zero setting), which is to be effected once for each workpiece on the scale 29 and the reading device 31 (Figure 6), the setting of the coordinate measurements, for example of the coordinate measurements 180, 128, can take place as follows:

(6) Setting the small scale 12 of the reading device (Figure 7) to the value 28/1000 mm. by rotating the setting ring 13 at the reading device, whereby there is to be selected the graduation of that scale of which the colour of the light corresponds to the lens 35 (Figures 8 and 9); for example scale 9a, red.

(7) The means holding the work table 25 (Figure 13) is released and the table is moved so far towards the left by rotating the handwheel 27 (Figures 8 and 9) that initially the division "180" of the coarse scale 29 coincides with the index 56 of the lens 35.

The accurate adjustment of the dimension 180 is however only obtained when, after the coarse adjustment of the table according to the coarse scale 29, that division line 7 of the precision scale which initially is disposed in accordance with the zero line of the larger upper (red) scale 6 of the reading device (Figure 7) is seen in the zero index fork of the scale 9.

(8) After making the adjustment according to 7, the table is displaced further in the same direction in accordance with the large scale 6 of the reading device (Figure 7) until the projected precision scale division 7 is seen in the fork of the graduation 0.1. By this means, the work table has been adjusted to the exact value of 180, 128 and is again fixed in its new position by clamping.

(9) It is also expedient for the adjusted dimension to be controlled by means of the coarse scale. With a correct setting, the index 56 of the eyepiece lens 35 (Figure 13) must be disposed between the divisions of the measurements 180 and 181 after completing the setting of the dimension 180, 128. In this way, it is possible to avoid the adjustment of the work table differing by 1 mm. as a result of the incorrect scale division being read on the large scale of the reading device (Figure 11).

We claim:

Machining apparatus comprising a bed, a tool displaceable on said bed, a member displaceable on said bed for adjustment relative to said tool, a measuring device fixed relative to said bed adjacent said member to measure displacements of said member, said measuring device having oppositely directed scales, and means fixed to said member and operatively disposed with respect to said scales for indicating measurements thereon; said means comprising a housing on said member displaceable along said measuring device, an indicator in the housing for indicating measurements on the scales, a rotatable device in said housing, a lens on said device for inspecting said scales, a mask on said device for selectively concealing one of the scales according to the rotation of said device, said device having a radial opening, and sources of different colors of light diametrically spaced on opposite sides of said device and selectively exposed to said measuring device by said radial slot whereby only one scale illuminated by a light of characteristic color can be viewed at a time.

References Cited in the file of this patent

UNITED STATES PATENTS

| | | |
|---|---|---|
| 471,093 | Bigelow | Mar. 22, 1892 |
| 1,110,195 | Erwin | Sept. 8, 1914 |
| 1,295,842 | Berger | Mar. 4, 1919 |
| 1,396,302 | Wagner | Nov. 8, 1921 |
| 1,497,492 | Engel | June 10, 1924 |
| 1,635,996 | Hapgood | July 19, 1927 |
| 1,660,435 | Craley | Feb. 28, 1928 |
| 1,684,212 | Berger | Sept. 11, 1928 |
| 1,829,971 | Trevellyan et al. | Nov. 3, 1931 |
| 2,018,363 | Hoelscher et al. | Oct. 22, 1935 |
| 2,043,625 | Lindner | June 9, 1936 |
| 2,095,666 | Helmond | Oct. 12, 1937 |
| 2,143,241 | Hallenbeck | Jan. 10, 1939 |
| 2,289,874 | Curtis | July 14, 1942 |
| 2,311,142 | Turrettini | Feb. 16, 1943 |
| 2,435,564 | Atwood | Feb. 10, 1948 |
| 2,488,351 | Turrettini | Nov. 15, 1949 |
| 2,835,045 | Buti | May 20, 1958 |